United States Patent
Roever et al.

(10) Patent No.: US 11,839,329 B2
(45) Date of Patent: Dec. 12, 2023

(54) THREE DIMENSIONAL INDUCTION RETHERMALIZING STATION AND CONTROL SYSTEM

(71) Applicant: The Vollrath Company, Sheboygan, WI (US)

(72) Inventors: Peter Roever, West Bend, WI (US); Yang Wang, Grafton, WI (US); John Wojcik, Sheboygan, WI (US)

(73) Assignee: THE VOLLRATH COMPANY, L.L.C., Sheboygan, WI (US)

( * ) Notice: Subject to any disclaimer, the term of this patent is extended or adjusted under 35 U.S.C. 154(b) by 0 days.

(21) Appl. No.: 17/677,114

(22) Filed: Feb. 22, 2022

(65) Prior Publication Data

US 2022/0175183 A1    Jun. 9, 2022

Related U.S. Application Data

(63) Continuation of application No. 16/365,366, filed on Mar. 26, 2019, now Pat. No. 11,291,330, which is a continuation of application No. 15/090,950, filed on Apr. 5, 2016, now Pat. No. 10,251,511, which is a continuation of application No. 13/712,792, filed on Dec. 12, 2012, now Pat. No. 9,307,862.

(51) Int. Cl.
*H05B 6/06* (2006.01)
*A47J 36/24* (2006.01)
*H05B 6/12* (2006.01)

(52) U.S. Cl.
CPC ............ *A47J 36/2483* (2013.01); *H05B 6/06* (2013.01); *H05B 6/065* (2013.01); *H05B 6/12* (2013.01); *H05B 6/1245* (2013.01); *H05B 6/1209* (2013.01); *H05B 6/1272* (2013.01)

(58) Field of Classification Search
CPC ...... H05B 6/062; H05B 6/065; H05B 6/1272; H05B 6/1245; H05B 6/1209; A23L 5/10; A23L 5/15; A23L 5/36
USPC .... 99/451, DIG. 14; 219/620, 621, 622, 627
See application file for complete search history.

(56) References Cited

U.S. PATENT DOCUMENTS 3,761,667 A    9/1973  Walden
3,775,577 A   11/1973  Peters, Jr.
(Continued)

FOREIGN PATENT DOCUMENTS

EP      0 458 977        12/1991
JP      04-267092         9/1992
WO      WO-2014/093476 A1  6/2014

OTHER PUBLICATIONS

Extended European Search Report for EP Application No. 13863536, dated Jan. 15, 2016, 2 pages.
(Continued)

*Primary Examiner* — Reginald Alexander
(74) *Attorney, Agent, or Firm* — Foley & Lardner LLP

(57) ABSTRACT

A method of operating a rethermalizing station having an induction coil includes detecting a temperature of a food pan, selecting, based on the temperature of the food pan, a selected mode from a set comprising a low temperature mode, an over temperature mode, and a keep warm mode, and varying, in accordance with the selected mode, an output power of the induction coil by controlling a supply current to the induction coil to vary between a first nonzero current value and a second nonzero current value.

20 Claims, 15 Drawing Sheets

(56) References Cited

U.S. PATENT DOCUMENTS

| | | | |
|---|---|---|---|
| 3,979,572 A | 9/1976 | Ito et al. | |
| 4,085,300 A | 4/1978 | Mackenzie et al. | |
| 4,356,371 A | 10/1982 | Kiuchi et al. | |
| 4,686,340 A | 8/1987 | Fukasawa | |
| 4,856,579 A | 8/1989 | Wolfe | |
| 4,990,749 A | 2/1991 | Devine et al. | |
| 5,070,222 A | 12/1991 | Yahav et al. | |
| 5,201,797 A | 4/1993 | Weng | |
| 5,386,102 A | 1/1995 | Takikawa et al. | |
| 5,512,733 A | 4/1996 | Takikawa et al. | |
| 5,746,119 A | 5/1998 | Matsumoto | |
| 6,145,333 A | 11/2000 | Richmond et al. | |
| 6,434,961 B2 | 8/2002 | Richmond et al. | |
| 6,774,346 B2 | 8/2004 | Clothier | |
| 6,774,356 B2 | 8/2004 | Heslin et al. | |
| 7,009,159 B2 | 3/2006 | Kataoka et al. | |
| 8,212,192 B2 * | 7/2012 | Tominaga | H05B 6/062 219/667 |
| 8,481,893 B2 | 7/2013 | Rosenbloom et al. | |
| 8,796,599 B2 | 8/2014 | Sakakibara et al. | |
| 9,307,862 B2 * | 4/2016 | Roever | H05B 6/1245 |
| 2002/0117497 A1 | 8/2002 | Bassill et al. | |
| 2002/0125245 A1 | 9/2002 | Fuchs | |
| 2004/0065658 A1 | 4/2004 | Damiano et al. | |
| 2005/0121438 A1 | 6/2005 | Hirota et al. | |
| 2008/0047948 A1 | 2/2008 | Rosenbloom et al. | |
| 2008/0257166 A1 | 10/2008 | Peng | |
| 2010/0258556 A1 | 10/2010 | Hayashi et al. | |
| 2010/0293979 A1 | 11/2010 | Shei et al. | |
| 2011/0000904 A1 | 1/2011 | Sakakibara et al. | |
| 2011/0011850 A1 | 1/2011 | Rosenbloom et al. | |
| 2011/0114618 A1 | 5/2011 | Chung et al. | |
| 2011/0175737 A1 | 7/2011 | Pforte et al. | |
| 2011/0180530 A1 | 7/2011 | Jeanneteau et al. | |
| 2012/0061381 A1 | 3/2012 | Hashimoto et al. | |
| 2012/0152932 A1 | 6/2012 | Moon et al. | |
| 2012/0285946 A1 | 11/2012 | Brosnan | |
| 2012/0305546 A1 * | 12/2012 | Filippa | H05B 6/062 219/660 |
| 2013/0008889 A1 | 1/2013 | Ogasawara et al. | |
| 2013/0082046 A1 | 4/2013 | Ogasawara et al. | |

OTHER PUBLICATIONS

Extended Search Report for European Application No. 17166801.5, dated Jul. 14, 2017, 5 pages.

Installation and Operation Manual for Garland induction Temperature Controlled Tabletop Hold-Line with RTCSmp Technology, 2013, Garland Commercial Ranged Limited, revised Jan. 17, 2014, 24 pages.

International Preliminary Report on Patentability for International Application No. PCT/US2013/074368, dated Jun. 25, 2015, 16 pages.

International Search Report and Written Opinion for Application No. PCT/US2013/074368, dated Mar. 27, 2014, 19 pages.

* cited by examiner

THREE DIMENSIONAL INDUCTION RETHERMALIZING STATION AND CONTROL SYSTEM

CROSS-REFERENCE TO RELATED PATENT APPLICATIONS

This application is a continuation of U.S. patent application Ser. No. 16/365,366, filed Mar. 26, 2019, which is a continuation of U.S. patent application Ser. No. 15/090,950, filed Apr. 5, 2016, which is a continuation of U.S. patent application Ser. No. 13/712,792, filed Dec. 12, 2012. All of the above-referenced applications are incorporated herein by reference in their entireties.

BACKGROUND

The present invention relates generally to the field of food service equipment. More specifically the present disclosure relates to serving stations having heated wells for warming or rethermalizing food items stored in food pans resting in the wells.

SUMMARY

One embodiment of the invention relates to a rethermalizing station for rethermalizing or warming food items. The rethermalizing station includes a well defined by an exterior wall, a food pan configured to be inserted into the well and to hold a food item, a first induction coil surrounding the exterior wall of the well, the first induction coil configured to warm the food item via inductive heating of the food pan, a first temperature sensor configured to detect a temperature of the food pan, and a control unit coupled to the first induction coil and the first temperature sensor, the control unit configured to control the first induction coil in response to the temperature of the food pan detected by the first temperature sensor such that temperature of the food pan is maintained at a targeted temperature.

Another embodiment of the invention relates to a rethermalizing station including a three-dimensional induction coil, and processing electronics configured to vary the output power of the induction coil in response to a comparison of a detected temperature and a targeted temperature.

Another embodiment of the invention relates to a rethermalizing station for rethermalizing or warming food items. The rethermalizing station includes a well defined by an exterior wall and a bottom, a food pan including a bottom and a sidewall, the food pan configured to be inserted into the well and to hold a food item, a three-dimensional side induction coil surrounding the exterior wall of the well, the side induction coil configured to warm the food item via inductive heating of the food pan, a bottom induction coil proximate to the bottom of the well, the bottom induction coil configured to warm the food item via inductive heating of the food pan, a bottom temperature sensor configured to detect a temperature of the bottom of the food pan, a side temperature sensor configured to detect a temperature of the sidewall of the food pan, and a control unit configured to control the power output of the side induction coil and the bottom induction coil in response to the temperature of the food pan detected by at least one of the bottom temperature sensor and the side temperature sensor such that temperature of the food pan is maintained at a targeted temperature.

BRIEF DESCRIPTION OF THE DRAWINGS

The invention will become more fully understood from the following detailed description, taken in conjunction with the accompanying drawings, in which.

DETAILED DESCRIPTION

Before turning to the figures, which illustrate the exemplary embodiments in detail, it should be understood that the application is not limited to the details or methodology set forth in the description or illustrated in the figures. It should also be understood that the terminology is for the purpose of description only and should not be regarded as limiting.

Referring to FIGS. 1-4, a rethermalizing station 100 according an exemplary embodiment is illustrated. The rethermalizing station 100 is configured to warm or rethermalize, but not cook, a food item by heating the food item to a specified temperature and then maintaining the food item at that specified temperature (e.g. a warming temperature of 155 degrees Fahrenheit for soup). Different food items may need to be warmed to different warming temperatures.

Figure 3:
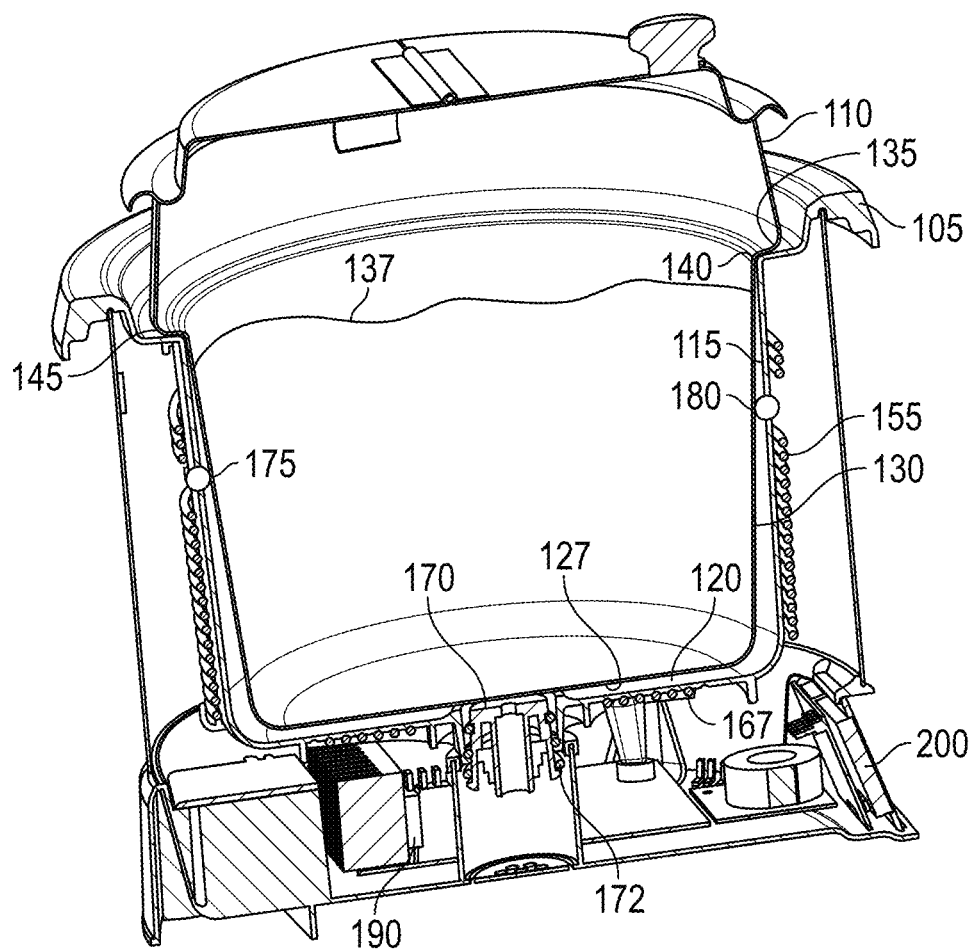
FIG. 3 is a cross-sectional view of the rethermalizing station of FIG. 1.
Figure 4:
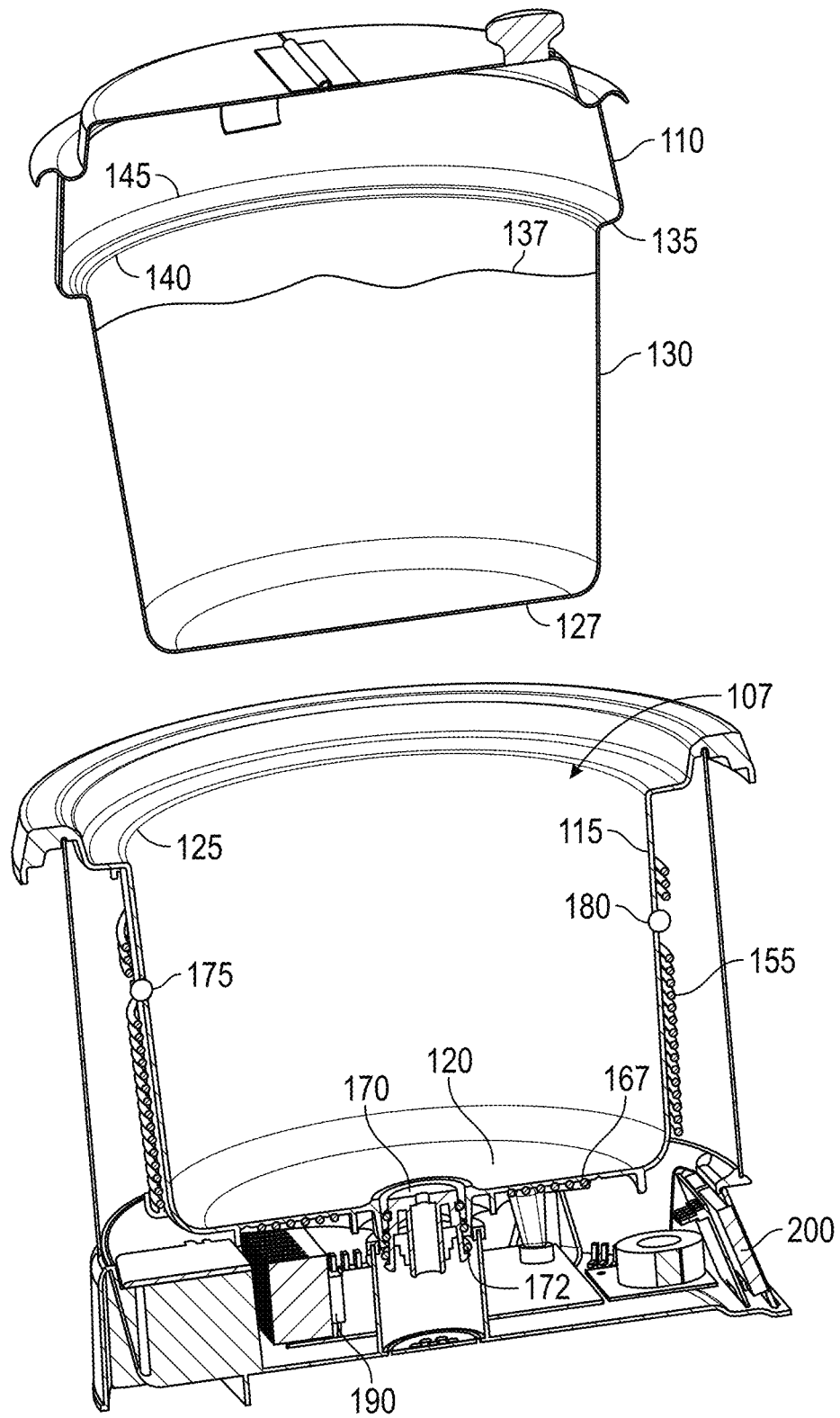
FIG. 4 is an exploded cross-sectional view of the rethermalizing station of FIG. 1.
Figure 5:
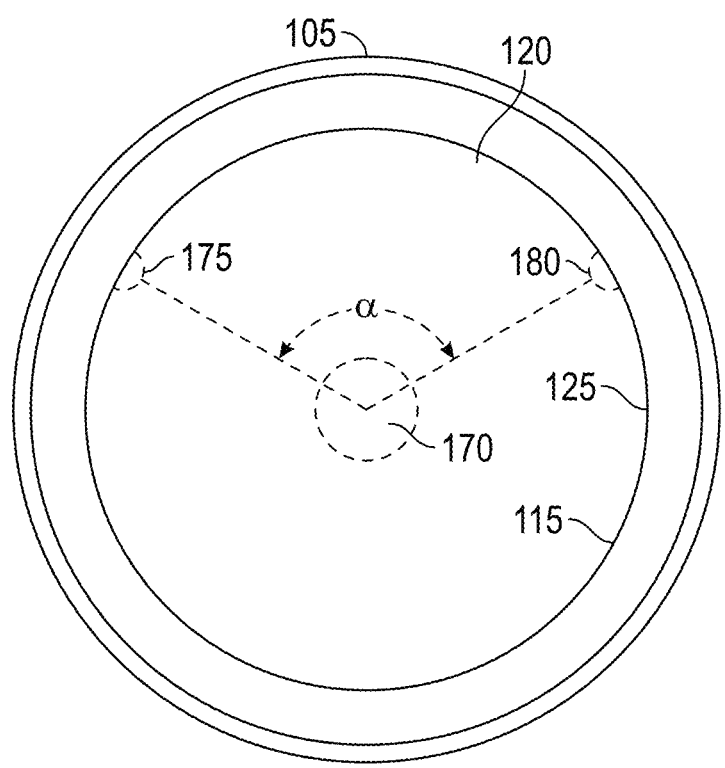
FIG. 5 is a top view of the well of the rethermalizing station of FIG. 1.
Figure 5A:
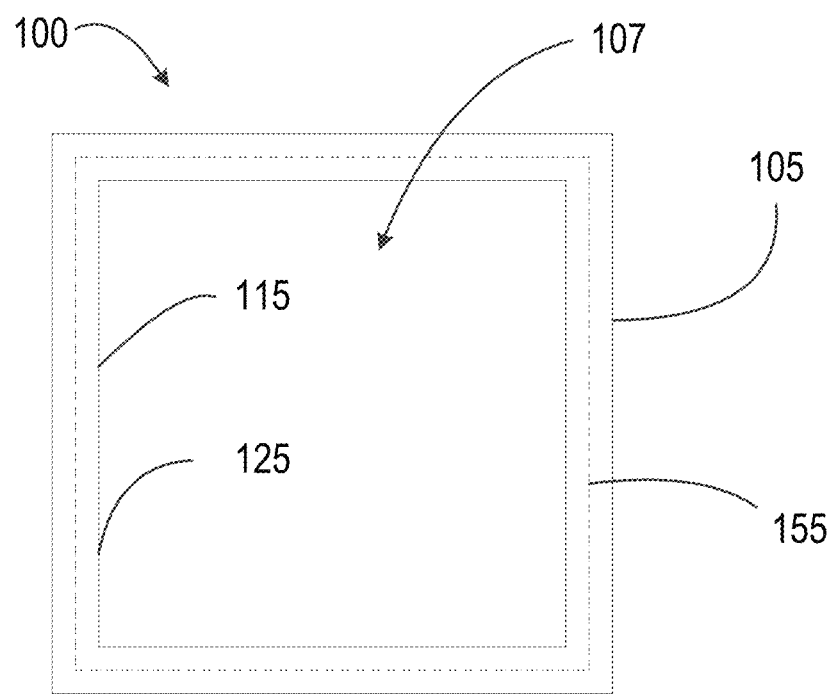
FIG. 5A is a top view of the well of a rethermalizing station according to an exemplary embodiment.

As shown in FIGS. 3-4, the well 107 defines an exterior wall 115 and a bottom 120. The exterior wall 115 has a perimeter 125 shaped to receive the food pan 110. The perimeter 125 can be circular (as shown in FIG. 5), a polygon (as shown in FIG. 5A), or other appropriate shapes.

In some embodiments, the well 107 is sized to accept a particular size of food pan (e.g., a 7-quart or 11-quart food pan).

As shown in FIGS. 3-4, the well 107 defines an exterior wall 115 and a bottom 120. The exterior wall 115 has a perimeter 125 shaped to receive the food pan 110. The perimeter 125 can be circular (as shown in FIG. 5), a polygon, or other appropriate shapes. In some embodiments, the well 107 is sized to accept a particular size of food pan (e.g., a 7-quart or 11-quart food pan).

Figure 1:
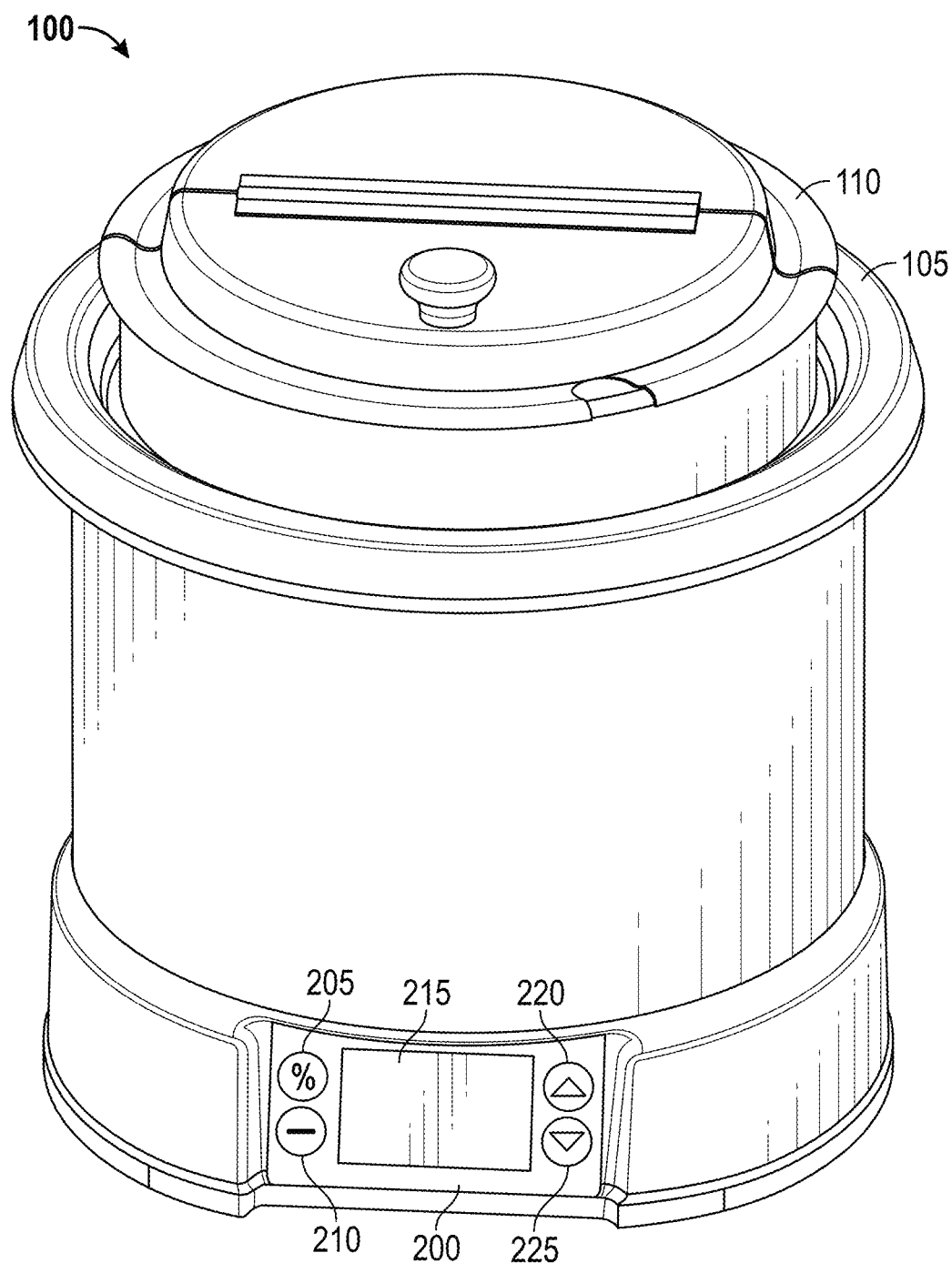
FIG. 1 is a perspective view of a rethermalizing station according to an exemplary embodiment.
Figure 2:
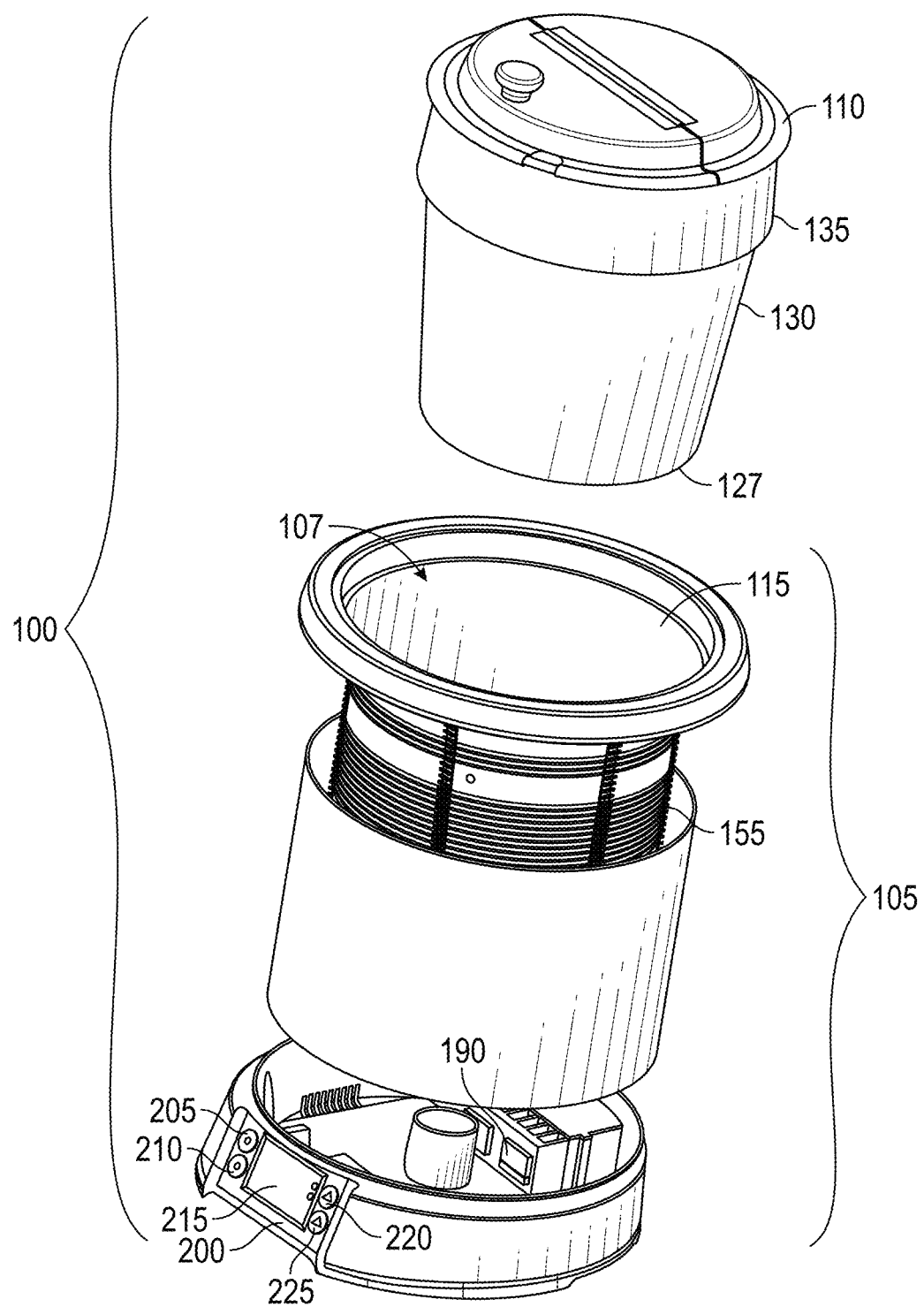
FIG. 2 is an exploded view of the rethermalizing station of FIG. 1.

As shown in FIGS. 2-4, the food pan 110 includes a bottom 127 and a sidewall that define a receptacle 130, and a lip 135. The receptacle 130 is configured to hold a food item 137. Examples of food items 137 include soups, stews, sauces, pasta dishes, and gravies. The lip 135 extends from the receptacle 130 so that the lip 135 overhangs a portion of the well 107 when the food pan 110 is inserted into the well 107 (as shown in FIG. 1). In some embodiments, the lip 135 rests on the base 105 and the bottom 127 of the food pan 110 is suspended above the bottom 120 of the well 107. The food pan 110 has an outer receptacle perimeter 140 proximate the lip 135 that has the same shape and substantially the same size as the well perimeter 125. The outer receptacle perimeter 140 can be circular, a polygon, or other appropriate shapes. The food pan 110 also has a lip perimeter 145. In some embodiments, the lip perimeter 145 has the same shape as the outer receptacle perimeter 140 (e.g., both circular or both polygons). In other embodiments, the lip perimeter 145 has a different shape than the outer receptacle perimeter 140. The food pan 110 is conductive (e.g., made of metal). In a preferred embodiment, the food pan 110 is made of magnetic stainless steel.

As shown in FIG. 3, the bottom 120 of the well 107 is located at a depth in the base 105 so that a substantial portion of the receptacle 130 of the food pan 110 is positioned in the well 107 when the food pan 110 is inserted into the well 107 so that the lip 135 rests on the rethermalizing station 100 and the bottom 127 of the food pan 110 is suspended above the bottom 120 of the well 107. In some embodiments, at least half of the receptacle 130 is positioned in the well 107.

The side induction coil 155 is configured to rethermalize or warm the food item 137 via inductive heating of the food pan 110. Because the side induction coil 155 surrounds the well 107, the food pan 110 will be inductively heated along the depth of the side induction coil 155 and about the receptacle 130 of the food pan 110. The turns of the side induction coil 155 can be a circle (as shown in FIG. 2), a polygon (as shown in FIG. 5A), or other appropriate shapes. In some embodiments, the side induction coil 155 is considered to be a cylinder.

The side induction coil 155 is configured to rethermalize or warm the food item 137 via inductive heating of the food pan 110. Because the side induction coil 155 surrounds the well 107, the food pan 110 will be inductively heated along the depth of the side induction coil 155 and about the receptacle 130 of the food pan 110. The turns of the side induction coil 155 can be a circle, a polygon, or other appropriate shapes. In some embodiments, the side induction coil 155 is considered to be a cylinder.

Referring to FIGS. 3-4, a bottom induction coil 167 is included proximate the bottom 120 of the well 107. The bottom induction coil 167 can be used alone or in combination with the side induction coil 155 to heat the food item 137 by inductively heating the bottom 127 of the food pan 110. In some embodiments, the side induction coil 155 and the bottom induction coil 167 are integrally formed as a single component so that the side induction coil 155 and the bottom induction coil 167 are electrically coupled together in series. In other embodiments, the side induction coil 155 and the bottom induction coil 167 are formed by multiple separate coils electrically coupled together in series. In some embodiments, the bottom induction coil 167 is replaced by a heating element (e.g., a resistive heating element, or other appropriate heating element). In other embodiments, the bottom induction coil 167 is omitted. For example, in a rethermalizing station suitable for use with hotel pans, the bottom induction coil would be omitted so that the same rethermalizing station could accept hotel pans of different depths.

In some embodiments, the side induction coil 155 is formed by multiple separate coils coupled together (e.g. an upper coil, a middle coil, and a lower coil). Such separate coils are able to be controlled individually to control the food item in warming zones within the food item located proximate each of the separate upper, middle, and lower coils. A side temperature sensor is located at the top of each the separate coils, so that the food pan temperature detected by each of these side temperature sensor is indicative of the food item temperature in each warming zone. Discrete control of the separate coils allows for precise control of food item temperature within each warming zone (e.g., to account for heating that could otherwise be uneven) and to shut off individual coils when the depth of the food item drops below the bottom of one of the coils, thereby conserving energy and preventing possible burning or scorching of any food item left on the walls of the food pan above the main body of the food item. In some embodiments, the bottom induction coil 167 is also divided into multiple coils in a similar manner.

As shown in FIGS. 3-5, the rethermalizing station 100 also includes a bottom temperature sensor 170 positioned proximate to the bottom 120 of the well 107. The bottom temperature sensor 170 is configured to detect a temperature of the food pan 110 proximate the bottom temperature sensor 170, which is indicative of a temperature of the food item 137 proximate the bottom temperature sensor 170. In some embodiments, the bottom temperature sensor 170 is biased away from the bottom 120 by a biasing member or spring 172 so that the bottom temperature sensor 170 is held against the bottom 127 of the food pan 110 without the food pan 110 contacting the bottom 120 of the well 107. Direct contact between the bottom temperature sensor 170 and the food pan 110 allows for a more accurate temperature measurement and for quicker response times in detecting changes in temperature than the temperature sensors used in known food serving stations. In known food serving stations, the temperature sensor is separated from the food pan by a piece of glass or another insulator and, in the case of steam bath warming stations, separated from the food in the food pan by both the food pan itself and the steam bath. In some embodiments, the bottom temperature sensor 170 is configured to detect a temperature of the food pan 110 without direct contact with the food pan 110. For example, an infrared (IR) or other remote temperature sensor could be used to detect the temperature of the food pan 110. An IR sensor would most likely be appropriate for use in combination with food pans having a non-stick or other coating. In some embodiments, the bottom temperature sensor 170 is not biased away from the bottom 120. In some embodiments, the bottom temperature sensor 170 is mounted flush with the bottom 120 (e.g. for direct contact sensors), recessed with respect to the bottom 120 (e.g., for non-contact sensors), or proud with respect to the bottom 120

(e.g., for direct contact sensors). In some embodiments, the bottom temperature sensor 170 is located in the center of the bottom 120.

As shown in FIGS. 3-5, in some embodiments, the rethermalizing station 100 also includes two side temperature sensors 175 and 180. In other embodiments, more or fewer side temperature sensors are included. The side temperature sensors 175 and 180 are positioned proximate the exterior wall 115 of the well 107 and at a different elevation than the bottom temperature sensor 170 and are configured to detect a temperature of the food pan 110 proximate the respective sensor 175 and 180, which is indicative of a temperature of the food item 137 proximate the respective sensor 175 and 180. In some embodiments, the side temperature sensors 175 and 180 are positioned to be at about the midpoint of the receptacle 130 of the food pan 110 when the food pan 110 is inserted into the well 107. In this way, the side temperature sensors 175 and 180 are able to detect a temperature indicative of the food item temperature proximate the sensors when the food pan 110 is between full and half-full. The side temperature sensors 175 and 180 are configured to directly contact the food pan 110. As shown in FIG. 5, the side temperature sensors 175 and 180 are spaced apart from one another, for example by an angle α with a vertex along an axis extending through the center of the well 107. The angle α is such that a food pan 110 inserted into the well 107 will always be in contact with one of the side temperature sensors 175 and 180 without regard for how out-of-round or otherwise out-of-shape, the food pan is 110. This is because the well 107, the food pan 110, and the angle α are sized such that a food pan 110 that was so out-of-shape so as to not contact both of the side temperature sensors 175 and 180 will not fit into the well 107. In some embodiments, the angle α is about 60 degrees. In some embodiments, the side temperature sensors 175 and 180 are configured to remotely detect a temperature of the food pan 110. In some embodiments, one or more of the temperature sensors 170, 175, and 180 are thermistors.

As shown in FIGS. 2-4, the rethermalizing station 100 also includes control unit 190 including processing electronics configured to control the operation of the induction coils 155 and 167 and other components in response to various inputs, including the temperatures of the food pan 110 detected by the various temperature sensors described above (e.g. temperature sensors 170, 175, and 180) and inputs from a user interface 200. The control unit 190 is coupled to the induction coils 155 and 167 and any input or output devices found in the specific embodiment of the rethermalizing station 100. The control unit 190 can include a processor and memory device. The processor can be implemented as a general purpose processor, an application specific integrated circuit (ASIC), one or more field programmable gate arrays (FPGAs), a group of processing components, or other suitable electronic processing components. Memory device (e.g., memory, memory unit, storage device, etc.) is one or more devices (e.g., RAM, ROM, Flash memory, hard disk storage, etc.) for storing data and/or computer code for completing or facilitating the various processes, layers and modules described in the present application. Memory device may be or include volatile memory or non-volatile memory. Memory device may include database components, object code components, script components, or any other type of information structure for supporting the various activities and information structures described in the present application. According to an exemplary embodiment, memory device is communicably connected to processor via processing circuit and includes computer code for executing (e.g., by processing circuit and/or processor) one or more processes described herein.

The control unit 190 is configured to control the induction coils 155 and 167 in response to various operating schemes. A power supply (not shown) is coupled to the induction coils 155 and 167 to supply power to the induction coils 155 and 167. When powered, an alternating current runs through the induction coils 155 and 167, thereby heating the conductive food pan 110 by electromagnetic induction. Heating the food pan 110 heats the food item. In embodiments where the food pan 110 is made from magnetic stainless steel, the alternating current has a frequency within a range of about 20 to 25 kHz. The power output of the induction coils 155 and 167 can be varied between 0 watts (e.g., off) and 800 watts (e.g., full power). For example, the power output of the induction coils 155 and 167 may varied between 90 watts and 720 watts. The power output of the induction coils 155 and 167 can be varied by varying the current supplied to the induction coils 155 and 167. For example, the current supplied to the induction coils 155 and 167 can vary between about 0.75 amps and about 7.0 amps. In some embodiments, a current of about 0.75 amps results in a power output of about 100 watts and a current of about 6.8 amps results in a power output of about 800 watts. It is believed that the ability to produce relatively low power outputs (e.g., about 100 watts), from constantly on (i.e., not duty-cycled) induction coils 155 and 167 is because the number of turns in the side induction coil 155 is greater than the number of turns in the bottom induction coil 167. For example, in some embodiments, the side induction coil 155 includes seventeen turns and the bottom induction coil 167 includes fourteen turns.

In known induction heating serving stations using a flat or two-dimensional induction coil, the output power of the induction coil is varied by implementing a duty cycle that sequentially turns the induction coil on and off. When the induction coil is on, a relatively high current (e.g. 10 amps) is supplied to the induction coil. By varying the duration of the on cycles and the off cycles, the total power output over a period of time can be varied. However, this duty cycle control can result in unwanted food item conditions. For example, soup warmed to a targeted warming temperature using duty cycle control can be heated to a temperature where the food item reaches a visible simmer or boil when the duty cycle is in an "on" portion and then stops boiling when the duty cycle is in an "off" portion. This cycle of starting and stopping boiling of the food item is because the duty cycle control is unable to consistently maintain the temperature of the food item at the targeted warming temperature, and instead continually bounces above and below the targeted warming temperature. This cyclical boiling is not only visually unappealing to consumers, but can also burn, scorch, or otherwise waste the food item.

The user interface 200 provide user inputs to the control unit 190 to control operation of the rethermalizing station 100. The user interface 200 allows the user to adjust various settings (e.g., the targeted warming temperature, the targeted temperature difference indicative of stratified temperatures, etc.) and activate one or more preset operating modes (e.g., a warming mode and a rethermalizing mode). The user interface 200 can be a series of buttons and a display screen, a touch screen, a series of buttons or switches and indicator lights, or any other conventional user interface capable of providing user inputs to the control unit 190 and displaying the selected user inputs and other information to the user. In some embodiments, the user interface 200, or one or more components of the user interface 200 (e.g., a display screen, a series of buttons or switches, etc.) is angled relative to vertical to make the user interface 200 easier for a user to view.

In some embodiments, in the rethermalizing mode, the induction coils 155 and 167 are operated at the maximum output power in order to quickly heat a refrigerated food item 137 to a targeted warming temperature. In some embodiments, in the warming mode, the induction coils 155 and 167 are operated at the minimum power output required to maintain the targeted warming temperature. In the warming mode, the power output can be reduced linearly, proportionally in response to a temperature difference between a detected temperature and the targeted warming temperature, in a step-wise fashion (e.g., full power, half power, quarter power, minimum maintainable power), or according to another appropriate algorithm.

The control unit 190 will automatically switch between rethermalizing mode and warming mode as needed to ensure that the detected temperature does not overshoot the targeted warming temperature while still maintaining the food pan 110 at the targeted warming temperature. For example, when the rethermalizing station 100 is set to rethermalizing mode and a refrigerated food item with a starting temperature of about 35 degrees Fahrenheit is to be rethermalized to 165 degrees Fahrenheit, the rethermalizing station 100 would operate in rethermalizing mode (i.e., induction coils 155 and 167 at maximum output power) until the detected temperature is a predetermined amount below the targeted warming temperature (e.g., 1 degree Fahrenheit, 2 degrees Fahrenheit, 3 degrees Fahrenheit, etc.), at which point, the rethermalizing station 100 switches to warming mode (e.g., induction coils 155 and 167 operated at minimum output power required to maintain targeted warming temperature) to slow the rate at which the food item is warmed so as to not overshoot the targeted warming temperature of 165 degrees Fahrenheit. The rethermalizing station 100 is capable of rethermalizing a refrigerated food item from 35 degrees Fahrenheit to 165 degrees Fahrenheit in about 30 minutes, which is well below an accepted industry standard of two hours for such a rethermalizing cycle. With the rethermalizing station 100 in warming mode, if the detected temperature were to drop a predetermined amount below the targeted warming temperature (e.g., 1 degree Fahrenheit, 2 degrees Fahrenheit, 3 degrees Fahrenheit, etc., for example, if refrigerated or colder food item was added to the warm food item in the warming station), the rethermalizing station 100 would automatically switch from warning mode to rethermalizing mode, and then, when appropriate, back to warming mode, to quickly return the food item to the targeted warming temperature.

The detected temperature used for comparison with the targeted warming temperature can be detected by one or more of the temperature sensors discussed above. For example, the detected temperature could be detected by the bottom temperature sensor 170, one of the side temperature sensors 175 and 180, or be an average of the temperatures detected by at least two of temperature sensors 170, 175, and 180.

The control unit 190 is configured to implement various control schemes in response to various inputs. In particular, various control schemes can be implemented in response to one or more detected temperatures (e.g., as detected by the various temperature sensors discussed above), differences between two or more detected temperatures, and/or differences between one or more detected temperatures and the targeted warming temperature. For example, when the temperature difference between one of the side temperature sensors 175 and 180 and the bottom temperature sensor 170 is greater than a predetermined amount (e.g., 30 degrees Fahrenheit) indicative of unwanted temperature stratification within the food item 137 (e.g., upper portion of the food item significantly hotter than the lower portion of the food item), the control unit 190 will activate an indicator that alerts the user that the food item 137 needs attention (e.g., stirring). By monitoring the temperature difference within the food item 137 in this way, food waste due to overheating of the food item 137 may be avoided. The indicator may be a light, an audible alarm, message, or other indication on the user interface 200, or other appropriate indicator. In some embodiments, an indicator may be periodically turned on in response to a timer to indicate a need for regular attention by the user (e.g., every 30 minutes).

As another example, the control unit 190 will turn off the induction coils 155 and 167 if the temperature detected by one or more of the bottom temperature sensor 170 and the side temperature sensors 175 and 180 exceeds an overheat temperature (e.g., 200 degrees Fahrenheit) that is indicative of the food item overheating, burning, or scorching. This prevents food waste from overheating the food item. In some embodiments, after the detected temperature drops sufficiently below the overheat temperature, the induction coils 155 and 167 are turned back on in the appropriate mode.

As another example, the control unit 190 will shut off the induction coils 155 and 167 in response to a relatively high current through the induction coils 155 and 167 that is indicative of food pan 110 not intended for use with the rethermalizing station 100 (i.e. a "bad" pan). A food pan with a relatively low resistance will not work in combination with the induction coils 155 and 167 to inductively heat the food pan and the low resistance will cause the current through induction coils 155 and 167 to increase. This current increase above the acceptable maximum current for a "good" pan will cause the induction coils 155 and 167 to be shut off and will turn on a bad pan indicator.

In some embodiments, the control unit 190 controls the power output of the side induction coil 155 proportionally to a difference between the detected temperature of the food pan 110 (e.g., as detected by bottom temperature sensor 170) and the targeted warming temperature. Such proportional control helps to prevent spikes in the temperature of the food item 137, thereby avoiding unwanted conditions of the food item 137 (e.g., causing the soup to boil).

The rethermalizing station 100 provides several benefits when compared to conventional steam bath or hot air warming stations. For example, there is no need to fill and refill a water reservoir, the rethermalizing station 100 provides a dry heat. This reduces labor and makes the rethermalizing station 100 less costly to operate. As another example, there is no need to provide air much hotter than the targeted warming temperature (e.g., using 300 degree Fahrenheit air to heat soup to a 160 degrees Fahrenheit targeted warming temperature). This is more energy efficient, thereby reducing operating costs. Also, this results in a device operating at lower temperatures. The variable power output of the induction coils 155 and 167 allows the rethermalizing station 100 to hold extremely consistent food item temperatures. This consistent temperature reduces food waste by reducing burning, scorching, and other damage to the food item 137 caused by overheating or inconsistent heating of the food item 137.

As shown in FIGS. 1-2, in some embodiments, the user interface 200 includes an on/off actuator 205, a function actuator 210, a display 215, a setting up actuator 220, and a setting down actuator 225. With the rethermalizing station 100 off, pressing the on/off actuator 205 will turn the warming station on and cause a welcome message to appear on the display 215. With the rethermalizing station 100 on, pressing the on/off actuator 205 will turn the rethermalizing station 100 off.

With the rethermalizing station 100 on, pressing the function actuator 210 once initiates warming mode and provides an indicator (e.g., the word "warm") on a portion of the display 215. The user can adjust one or more settings in warm mode by pressing the setting up actuator 220 or the setting down actuator 225. In some embodiments, there is no need to "enter" the selected setting, the control unit 190 will do so after a set period of time has passed without an actuator being pushed. In other embodiments, an enter actuator may be used to "enter" the selected setting. Settings may include the targeted warming temperature as measured in degrees Fahrenheit or Celsius or preset targeted warming temperatures, each of which is associated with a type of food item 137 (e.g., chili, soup (regular), soup (cream), macaroni and cheese, etc.). Indicators for the various settings are shown on a portion of the display 215. In some embodiments, the control unit 190 will remember the user selected settings for warm mode so that warm mode setting will not need to be reentered by the user if the rethermalizing station 100 is cycled off and then on.

With the rethermalizing station 100 on, pressing the function actuator 210 twice initiates rethermalizing mode and provides an indicator (e.g., the word "retherm") on a portion of the display 215. The user can adjust one or more settings in rethermalizing mode by pressing the setting up actuator 220 or the setting down actuator 225. In some embodiments, there is no need to "enter" the selected setting, the control unit 190 will do so after a set period of time has passed without an actuator being pushed. In other embodiments, an enter actuator may be used to "enter" the selected setting. Settings may include the targeted rethermalizing temperature as measured in degrees Fahrenheit or Celsius or preset targeted rethermalizing temperatures. Additionally, in some embodiments, the user is able cancel rethermalizing mode through use of a cancel setting. Indicators for the various settings are shown on a portion of the display 215. In some embodiments, the control unit 190 will not remember the user selected settings for rethermalizing mode so rethermalizing mode settings will need to reentered by the user if the rethermalizing station 100 is cycled off and then on. Rethermalizing mode is suitable for use with food items 137 that are refrigerated when first introduced to the rethermalizing station 100 and need to be rethermalized from refrigerated to a targeted warming temperature.

With the rethermalizing station 100 on, the user interface 200 can be placed in a lock mode to disable the various actuators of the user interface 200 to prevent the mode being changed (e.g., from warming mode to rethermalizing mode or vice versa) and to prevent the settings from being changed (step 355). In some embodiments, lock mode is initialized by pressing the on/off actuator 205 and the setting down actuator 225 at the same time for a duration of three seconds. The rethermalizing station 100 will remember lock mode even if the rethermalizing station 100 is cycled off and then on. To unlock the user interface 200 and exit lock mode, the on/off actuator 205 and the setting down actuator 225 are pressed at the same time for a duration of three seconds.

Figure 6:
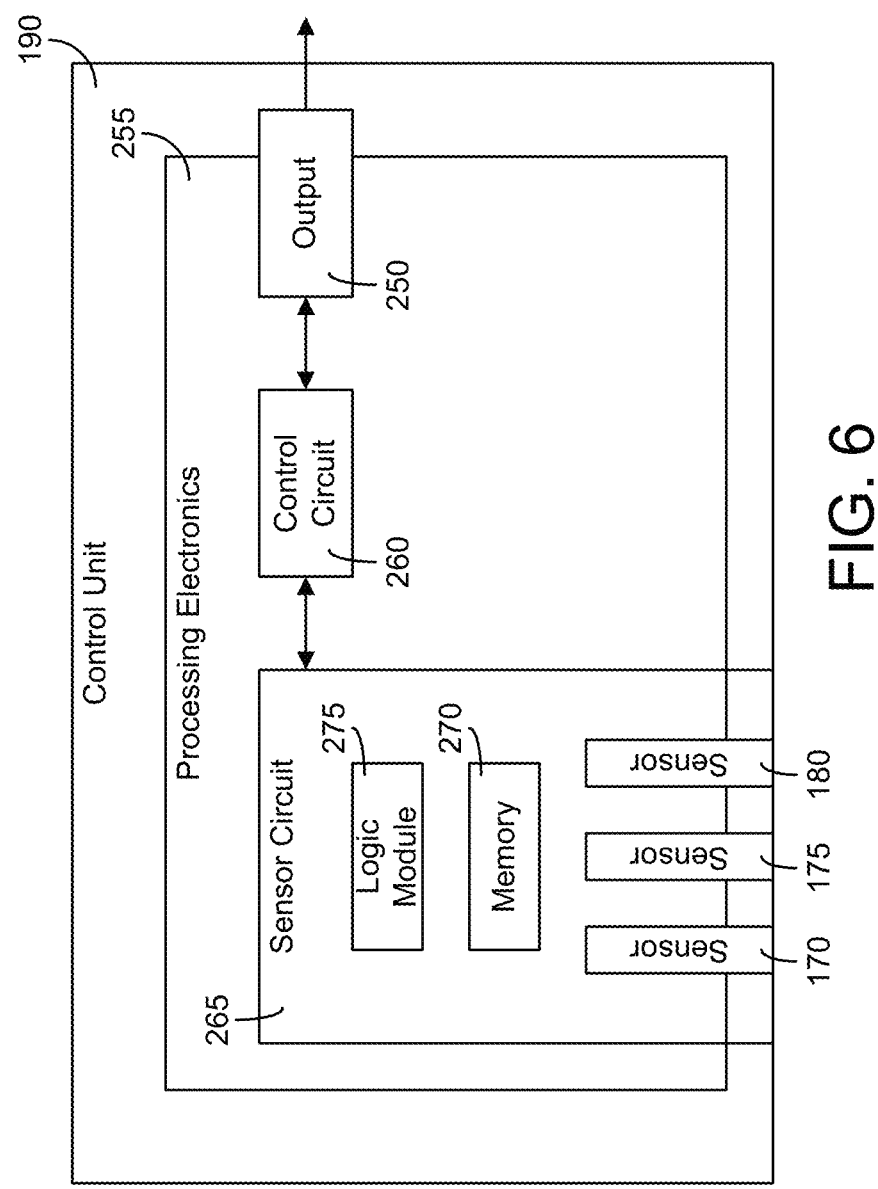
FIG. 6 is a detailed block diagram of the control unit of the rethermalizing station of FIG. 1, according to an exemplary embodiment.

Referring now to FIG. 6, a detailed block diagram of the control unit 190 is shown, according to an exemplary embodiment. The control unit 190 is generally configured to include circuitry configured with an algorithm to control the power output of the inductions and thereby control the temperature of the food item, an algorithm configured to prevent burning the food item, and/or other algorithms for allowing the control unit 190 to send and receive commands or information related to the operation of the rethermalizing station 100. The control unit 190 includes an output 250 configured to controllably switch on, increase, decrease, or switch off the output power of the side induction coil 155 and the bottom induction coil 167.

The control unit 190 also includes processing electronics 255. Processing electronics 255 generally utilizes electronics circuits and components (e.g., control circuits, relays, etc.) to effect the control activities described herein. In the example shown in FIG. 6, processing electronics 255 is embodied as a circuit (spread over one or more printed circuit boards) including a control circuit 260. Control circuit 260 receives and provides data or control signals from/to the output 250 and a sensor circuit 265. Control circuit 260 is configured to cause the side induction coil 155 and the bottom induction coil 167 of the rethermalizing station 100 to turn on and off or to vary their output power via control signals sent to output 250. For example, control circuit 260 can make a determination that an "on" or "off" signal should be sent to output 250 based on inputs received from sensor circuit 265. Sensor circuit 265 includes inputs from temperature sensors 170, 175, and 180 and memory 270. For example, based on temperatures detected by temperature sensors 170, 175, and 180 and sensor circuit 265, and a targeted temperature set point stored in memory 270, a logic module 275 may determine that control circuit 260 should change states, such that output 250 changes the output power of the side induction coil 155 and the bottom induction coil 167. Other control decisions, logic and activities provided by the control unit 190 and the components thereof are described below and with reference to other Figures.

Referring to FIGS. 7-12, an exemplary control scheme for the rethermalizing station 100 will be described in more detail. The control unit 190 is configured to effect at least four modes: (1) a low temperature mode, where the food item is well below a targeted temperature; (2) an over temperature mode, where the food item is well above the targeted temperature; (3) a keep warm mode, where the food item is at or close to the targeted temperature; and (4) a burning prevention mode, where the maximum output power of the induction coil is limited to prevent burning the food item.

Figure 7:
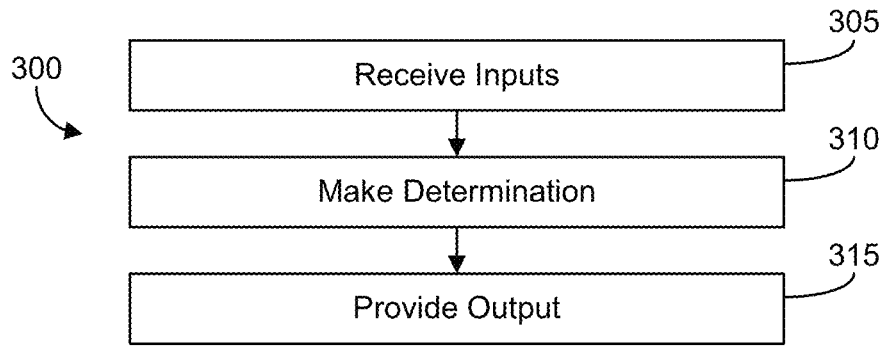
FIG. 7 is a flow chart of a process for controlling a rethermalizing station, according to an exemplary embodiment.

Referring to FIG. 7, a flow chart of a process 300 for controlling the side induction coil 155 and the bottom induction coil 167 is shown, according to an exemplary embodiment. The process 300 includes receiving inputs from the temperature sensors 170, 175, and 180 indicative of the temperature detected by each sensor and from the memory 270 indicative of a temperature set point or other user-selected input (step 305). Once received, the processing electronics 255 determines whether the received inputs represent a condition of the food item that should be acted upon (e.g., by changing the output power of the side induction coil 155 and the bottom induction coil 167) (step 310). The processing electronics 255 then sends the appropriate control signal to the output 250 (e.g., to change the output power of the side induction coil 155 and the bottom induction coil 167) (step 315).

Figure 8:
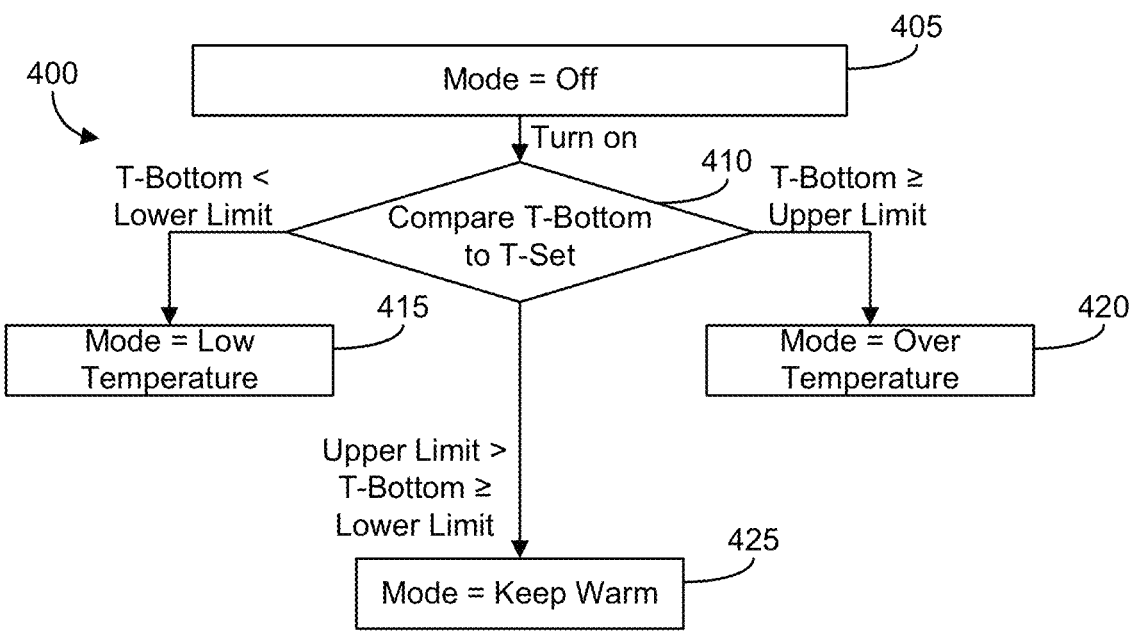
FIG. 8 is a flow chart of a process for providing an initial mode assignment for controlling a rethermalizing station, according to an exemplary embodiment.

Referring to FIG. 8, a flow chart of a process 400 for providing an initial mode assignment when the rethermalizing station 100 is turned on is shown, according to an exemplary embodiment. Process 400 begins at step 405 where the mode is set to off. At step 410, the temperature detected by the bottom temperature sensor 170 ("T-Bottom") is compared to a user-selected targeted temperature that will provide the desired food item temperature ("T-Set"). When T-Bottom is less than a lower limit relative to the targeted temperature, the mode is set to the low temperature mode (step 415). The lower limit is some percentage less than 100 of T-Set (e.g., T-Set minus 3° C.). When T-Bottom is greater than or equal to an upper limit relative to the targeted temperature, the mode is set to the over temperature mode (step 420). The upper limit is some percentage greater than 100 of T-Set (e.g., T-Set plus 2° C.). When T-Bottom is less than the upper limit and greater than or equal to the lower limit, the mode is set to the keep warm mode (step 425). The low temperature mode is configured to quickly heat a food item that is at a temperature below the lower limit to the targeted temperature by operating the side induction coil 155 and the bottom induction coil 167 at the maximum output power (e.g., 800 Watts or 100% power) or near the maximum output power (e.g., 600 Watts or 75% power). The over temperature mode is configured to provide minimal heat to a food item that is at a temperature above the upper limit to allow the temperature to return to the targeted temperature by operating the side induction coil 155 and the bottom induction coil 167 at a minimum output power (e.g. off, 1% power). The keep warm mode is configured to provide the heating necessary to maintain the food item at or near the targeted temperature by varying the output power of the side induction coil 155 and the bottom induction coil 167 between the maximum output power (e.g., 100% power) and the minimum output power (e.g. 1% power). The burning prevention mode is configured to limit the maximum output power of the side induction coil 155 and the bottom induction coil 167, when a temperature detected by one of the side temperature sensors 175 and 180 exceeds a burn warning temperature (e.g., 99° C.). When the burning prevention mode is activated, the maximum output power set by the burning prevention mode limits the maximum output power available in any of the other three modes of operation.

Figure 9:
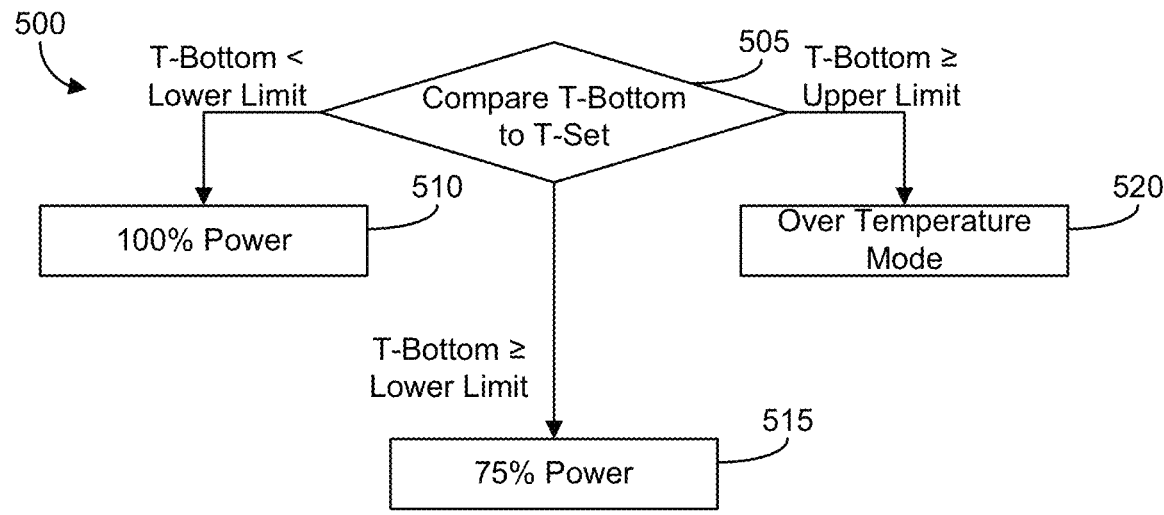
FIG. 9 is a flow chart of a process for a low temperature mode of operation for a rethermalizing station, according to an exemplary embodiment.

Referring to FIG. 9, a flow chart of a process 500 of the low temperature mode is shown, according to an exemplary embodiment. Process 500 beings at step 505 with a comparison of T-Bottom to T-Set. When T-Bottom is less than a low temperature mode lower limit (e.g., T-Set plus 1° C.), the output power of the side induction coil 155 and the bottom induction coil 167 ("coil output power") is set to 100% power (e.g., 800 Watts) (step 510). When T-Bottom is greater than or equal to the low temperature mode lower limit, the coil output power is set to a reduced power such as 75% power (e.g., 600 Watts) (step 515). When T-Bottom is greater than or equal to a low temperature mode upper limit (e.g., T-Set plus 3° C.), the mode changes to the over temperature mode (step 520).

Figure 10:
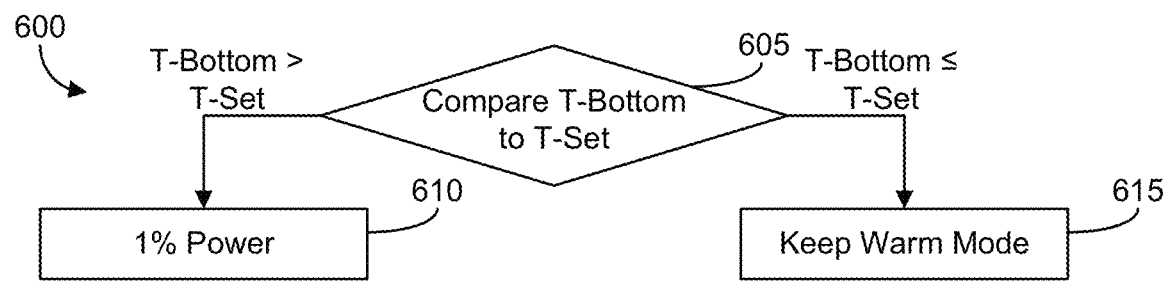
FIG. 10 is a flow chart of a process for an over temperature mode of operation for a rethermalizing station, according to an exemplary embodiment.

Referring to FIG. 10, a flow chart of a process 600 of the over temperature mode is shown, according to an exemplary embodiment. Process 600 begins at step 605 with a comparison of T-Bottom to T-Set. When T-Bottom is greater than T-Set, the coil output power is set to a minimum output power such as 1% power (e.g., 8 Watts) (step 605). When T-Bottom is less than or equal to T-Set, the mode changes to the keep warm mode (step 610).

Figure 11:
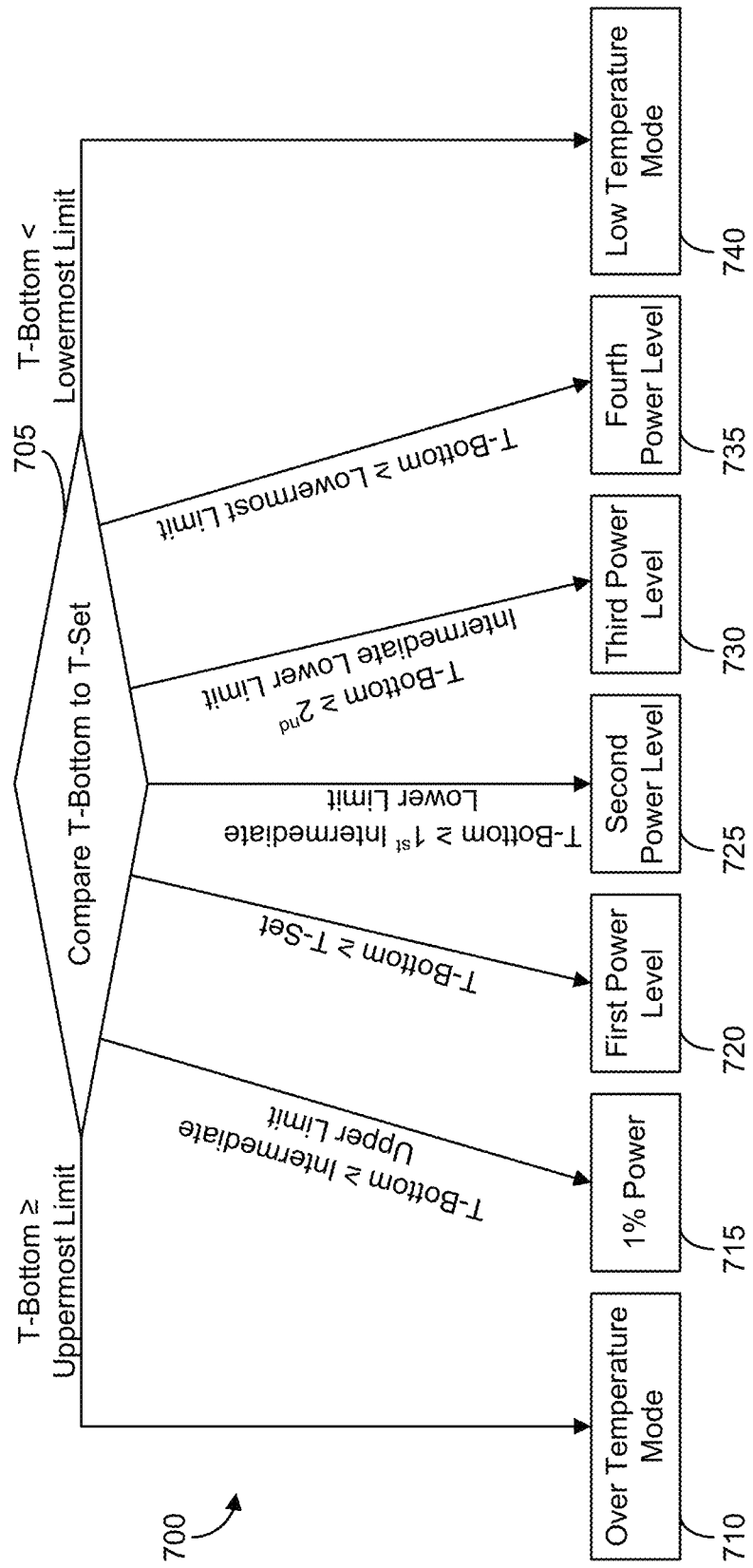
FIG. 11 is a flow chart of a process for a keep warm mode of operation for a rethermalizing station, according to an exemplary embodiment.

Referring to FIG. 11, a flow chart of a process 700 of the keep warm mode is shown, according to an exemplary embodiment. Process 700 begins at step 705 with a comparison of T-Bottom to T-Set. When T-Bottom is greater than or equal to an uppermost limit (e.g., T-Set plus 2° C.), the mode changes to the over temperature mode (step 710). When T-Bottom is greater than or equal to an intermediate upper limit (e.g., T-Set plus 1° C.), the coil output power is set to a minimum output power such as 1% power (e.g., 8 Watts) (step 715). When T-Bottom is greater than or equal to T-Set, the coil output power is set to a first power level (e.g., T-Set multiplied 3.2 Watts) (step 720). When T-Bottom is greater than or equal to a first intermediate lower limit (e.g., T-Set minus 1° C.), the coil output power is set to a second power level greater than the first power level (e.g., T-Set multiplied by 4.8 Watts) (step 725). When T-Bottom is greater than or equal to a second intermediate lower limit (e.g., T-Set minus 2° C.), the coil output power is set to a third power level greater than the second power level (e.g., T-Set multiplied by 6.4 Watts) (step 730). When T-Bottom is greater than or equal to a lowermost limit (e.g., T-Set minus 3° C., the coil output power is set to a fourth power level greater than the third power level (e.g., T-Set multiplied by 8 Watts) (step 735). When T-Bottom is less than the lowermost limit, the mode changes to the low temperature mode (step 740).

Figure 12:
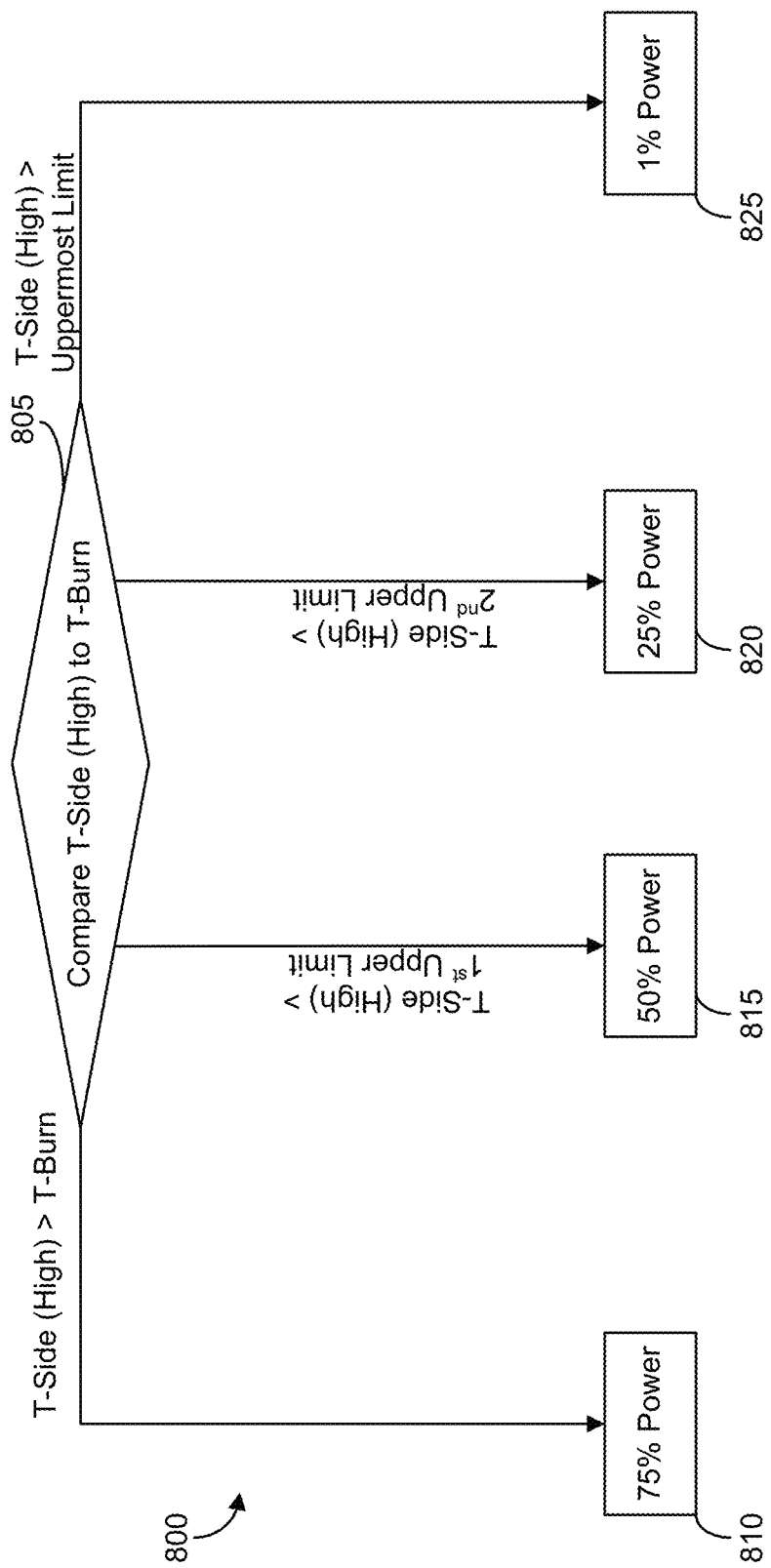
FIG. 12 is a flow chart of a process for a burning prevention mode of operation for a rethermalizing station, according to an exemplary embodiment.
Figure 13:
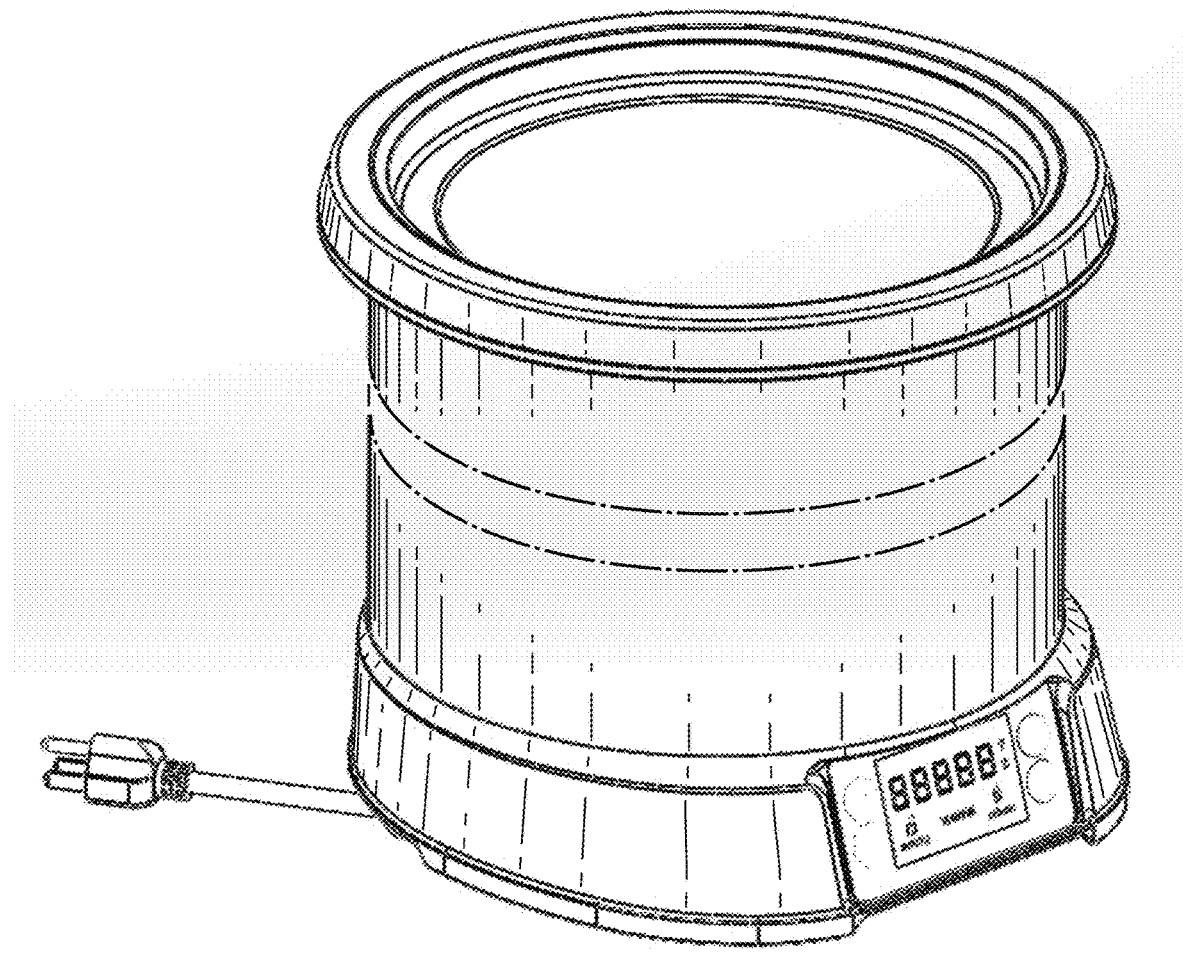
FIG. 13 is a perspective view of a base of a rethermalizing station according to an exemplary embodiment.
Figure 14:
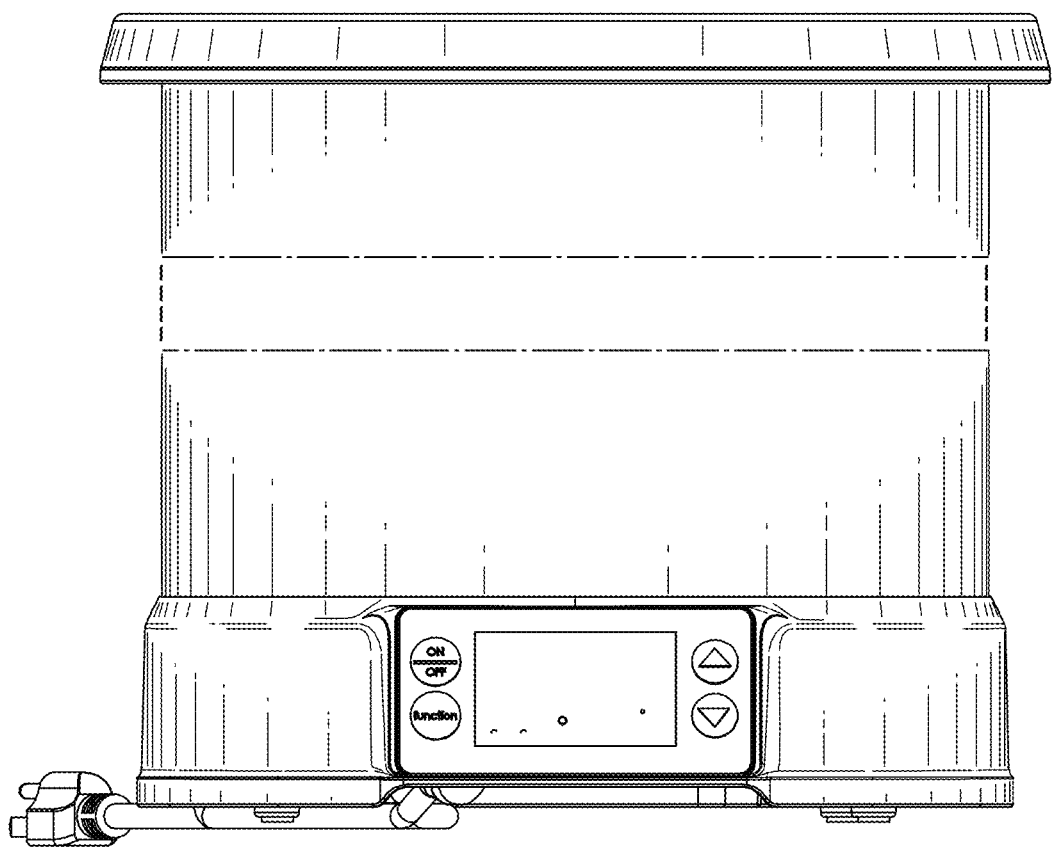
FIG. 14 is a front view of the base of FIG. 13.
Figure 15:
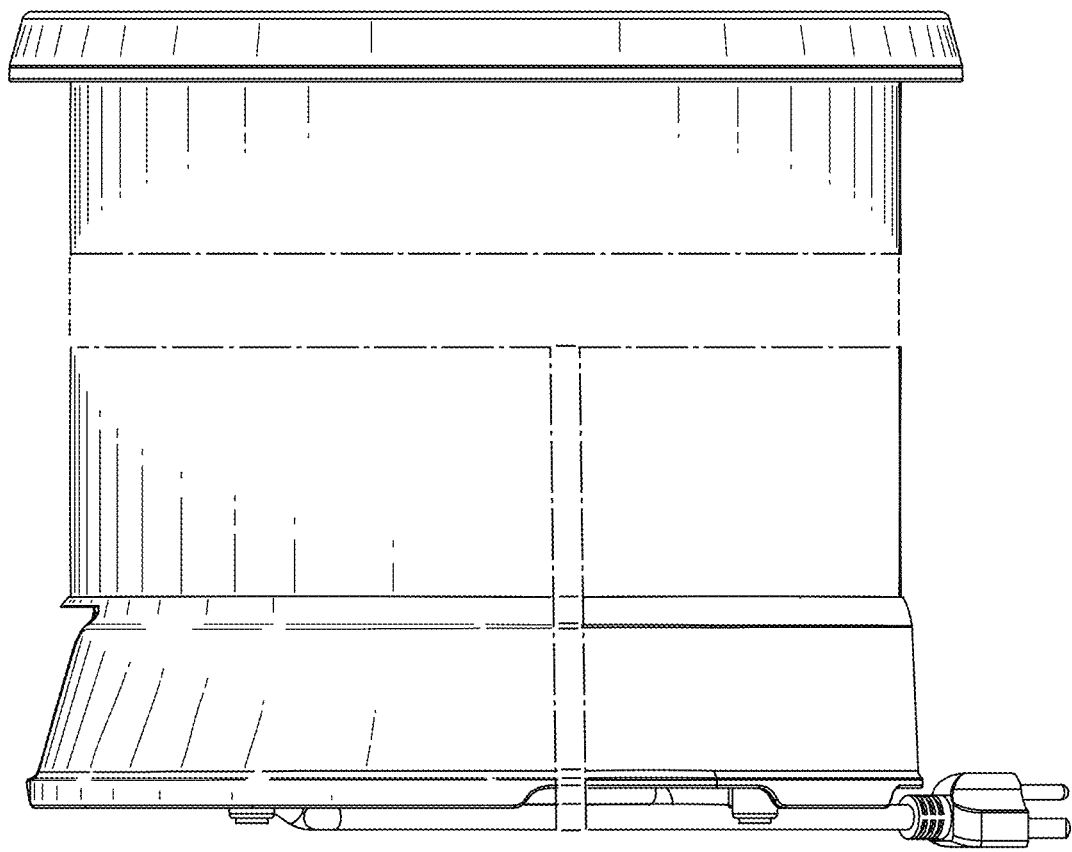
FIG. 15 is a side view of the base of FIG. 13.
Figure 16:
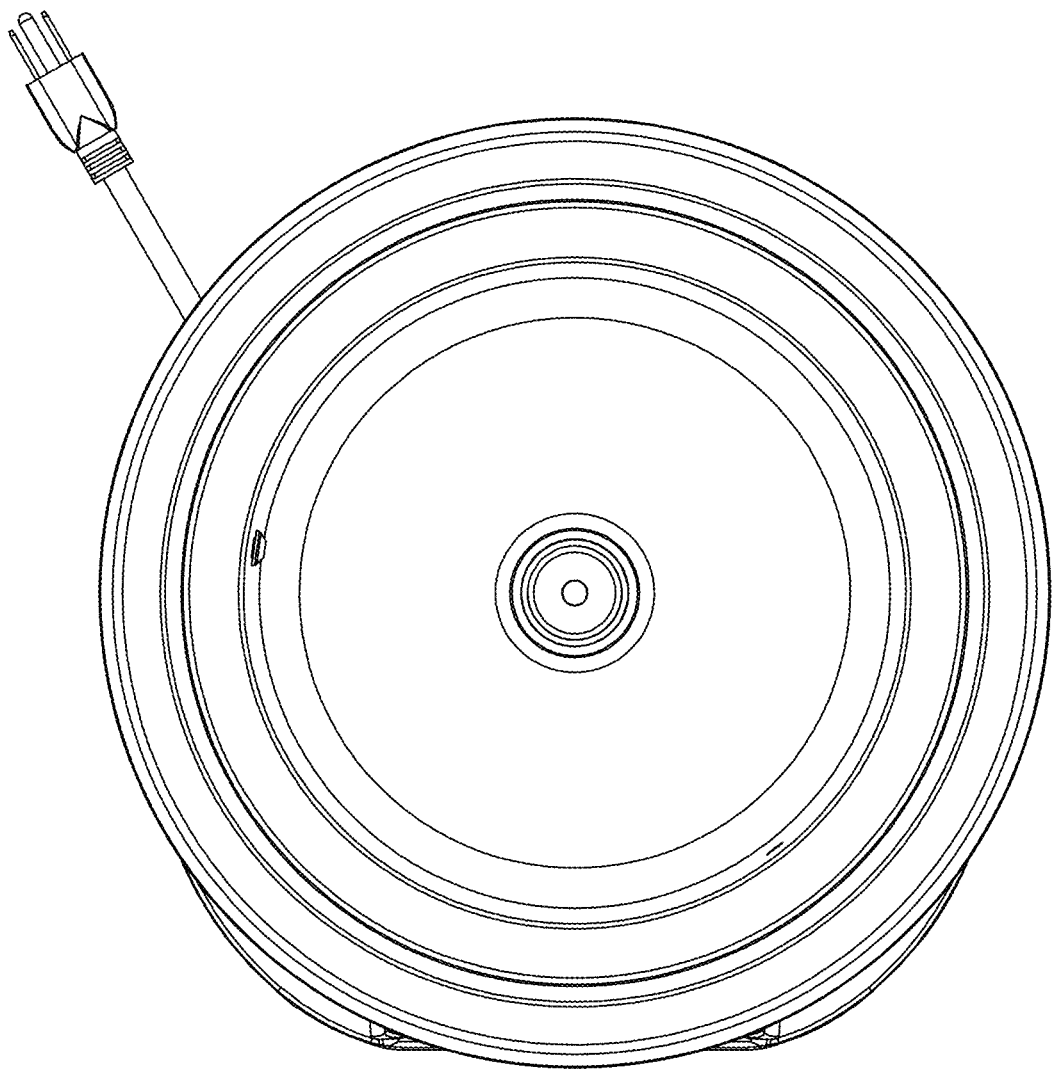
FIG. 16 is a top view of the base of FIG. 13.

Referring to FIG. 12, a flow chart of process 800 of the burning prevention mode is shown, according to an exemplary embodiment. Process 800 begins at step 805 with a comparison of the highest temperature detected by either of the side temperature sensors 175 and 180 ("T-Side (High)") with the burn warning temperature ("T-Burn") (e.g., 99° C.). When T-Side (High) is greater than the burn warning temperature, the coil output power cannot exceed 75% power (e.g., 600 Watts) (step 810). When T-Side (High) is greater than a first upper limit (e.g., T-Burn plus 2° C.), the coil output power cannot exceed a first reduced output power such as 50% power (e.g., 400 Watts) (step 815). When T-Side (High) is greater than a second upper limit (e.g., T-Burn plus 4° C.), the coil output power cannot exceed a second reduced output power such as 25% power (e.g., 200 Watts) (step 820). When T-Side (High) is greater than an uppermost limit (e.g., T-Burn plus 6° C.), the coil output power cannot exceed a minimum output power such as 1% power (e.g., 8 Watts) (step 825).

FIGS. 13-16 illustrate a base (e.g., base 105) of a rethermalizing station (e.g., rethermalizing station 100) according to an exemplary embodiment.

The construction and arrangement of the apparatus, systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, some elements shown as integrally formed may be constructed from multiple parts or elements, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show or the description may provide a specific order of method steps, the order of the steps may differ from what is depicted. Also two or more steps may be performed concurrently or with partial concurrence. Such variation will depend on various factors, including software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A method of operating a rethermalizing station comprising a three-dimensional induction coil, the method comprising:
obtaining a detected temperature of a food pan;
performing a comparison of the detected temperature and a targeted temperature; and
varying, based on the comparison, an output power of the three-dimensional induction coil between a first nonzero output power value and a second nonzero output power value by controlling a supply current to the three-dimensional induction coil to vary between a first nonzero current value and a second nonzero current value and by driving the output power to the first nonzero output power value in response to the detected temperature being greater than an upper limit of the targeted temperature.

2. The method of claim 1, comprising implementing a low temperature mode and an over temperature mode in response to the comparison of the detected temperature and the targeted temperature.

3. The method of claim 2, wherein implementing the low temperature mode comprises driving the output power of the three-dimensional induction coil to the second nonzero output power value.

4. The method of claim 2, wherein implementing the over temperature mode comprises driving the output power of the three-dimensional induction coil to the first nonzero output power value.

5. The method of claim 2, wherein implementing the low temperature mode and the over temperature mode in response to the comparison of the detected temperature and the targeted temperature comprises selecting the low temperature mode when the detected temperature is less than a lower limit of the targeted temperature.

6. The method of claim 2, wherein implementing the low temperature mode and the over temperature mode in response to the comparison of the detected temperature and the targeted temperature comprises selecting the over temperature mode when the detected temperature is greater than the upper limit of the targeted temperature.

7. The method of claim 1, further comprising implementing a keep warm mode in response to the comparison of the detected temperature and the targeted temperature, wherein implementing the keep warm mode comprises providing a variable output power of the three-dimensional induction coil between the first nonzero output power value and the second nonzero output power value.

8. The method of claim 7, wherein implementing the keep warm mode in response to the comparison of the detected temperature and the targeted temperature comprises selecting the keep warm mode when the detected temperature is greater than a lower limited of the targeted temperature and less than the upper limit of the targeted temperature.

9. The method of claim 1, further comprising implementing a burning prevention mode in response to the comparison of the detected temperature and the targeted temperature, wherein the burning prevention mode comprises causing the output power to be less than the second nonzero output power value.

10. The method of claim 9, wherein implementing the burning prevention mode in response to the comparison of the detected temperature and the targeted temperature comprises selecting the burning prevention mode when the detected temperature is greater than a burn warning temperature, wherein the burn warning temperature is greater than the targeted temperature.

11. The method of claim 1, wherein the first nonzero current value is 0.75 amps and the second nonzero current value is 6.8 amps.

12. The method of claim 1, wherein the first nonzero output power value is 8 watts and the second nonzero output power value is 800 watts.

13. The method of claim 1, wherein varying the output power of the three-dimensional induction coil comprises driving the output power to the second nonzero output power value in response to the detected temperature being less than a lower limit of the targeted temperature.

14. The method of claim 13, wherein varying the output power of the three-dimensional induction coil further comprises providing a variable output power of the three-dimensional induction coil in response to the detected temperature being less than the upper limit of the targeted temperature and greater than the lower limit of the targeted temperature.

15. The method of claim 13, further comprising wherein the varying the output power of the three-dimensional induction coil further comprises driving the output power to less than the second nonzero output power value in response to the detected temperature being greater than a burn warning temperature, wherein the burn warning temperature is greater than the targeted temperature.

16. A method of operating a rethermalizing station comprising an induction coil, the method comprising:
    detecting a temperature of a food pan;
    selecting, based on the temperature of the food pan, a selected mode from a set comprising a low temperature mode, an over temperature mode, and a keep warm mode, wherein selecting the selected mode comprises selecting the over temperature mode responsive to the detected temperature being greater than an upper limit of the targeted temperature; and
    varying, in accordance with the selected mode, an output power of the induction coil, wherein:
        varying the output power of the induction coil in accordance with the over temperature mode comprises providing a first non-zero output power of the induction coil; and
        varying the output power of the induction coil in accordance with the low temperature mode comprises providing a second non-zero output power of the induction coil.

17. The method of claim 16, comprising controlling a supply current to the induction coil to vary between a first nonzero current value and a second nonzero current value to cause the output power to vary between the first nonzero output power and the second nonzero output power.

18. The method of claim 16, wherein selecting, based on the temperature of the food pan, the selected mode comprises comparing the temperature of the food pan to a lower limit and the upper limit, the lower limit and the upper limit defined relative to a targeted temperature.

19. The method of claim 16, wherein the set further comprises a burn prevention mode.

20. The method of claim 16, wherein varying, in accordance with the selected mode, the output power comprises operating the induction coil at a variable output power between the first non-zero output power and the second non-zero output power when the selected mode is the keep warm mode.

* * * * *